Aug. 8, 1939.   M. ASPENES   2,168,855
SEEDER
Filed Aug. 7, 1936   2 Sheets-Sheet 1

Inventor
Manthen Aspenes
By
Attorney

Aug. 8, 1939.                M. ASPENES                2,168,855
                              SEEDER
                        Filed Aug. 7, 1936          2 Sheets-Sheet 2
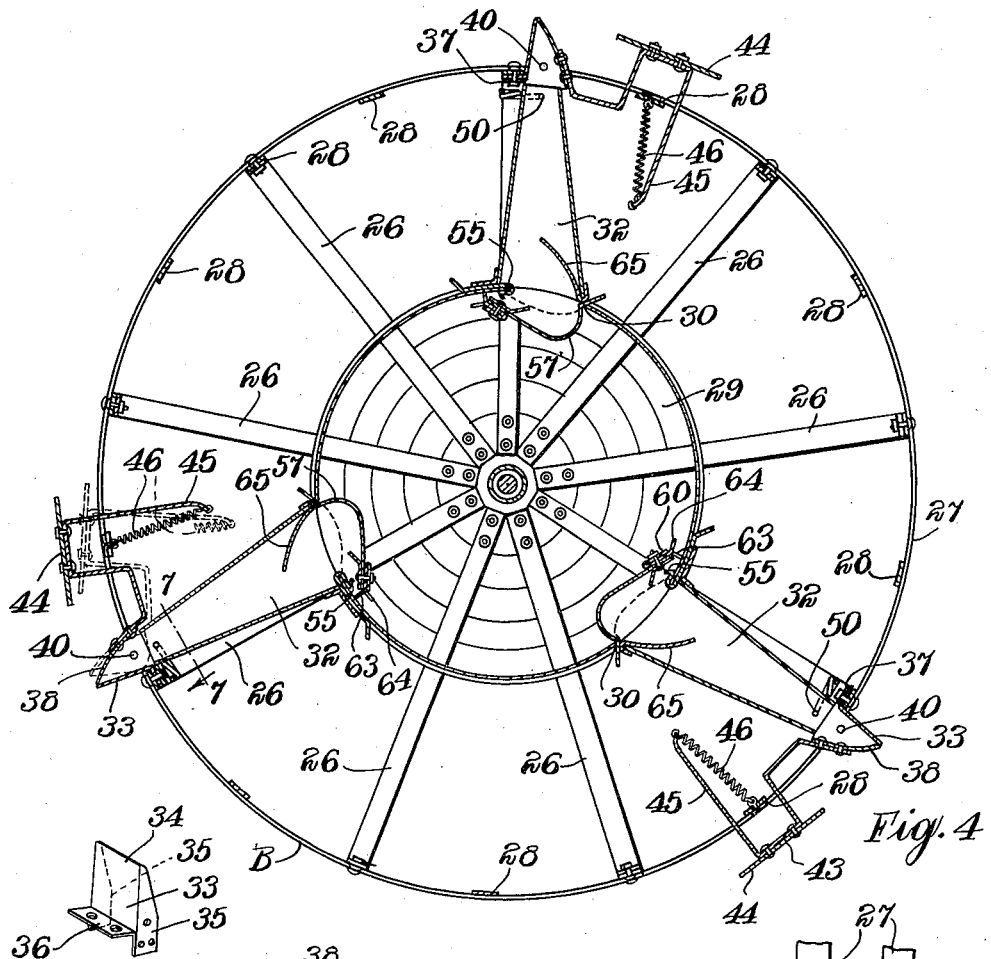
Fig. 4
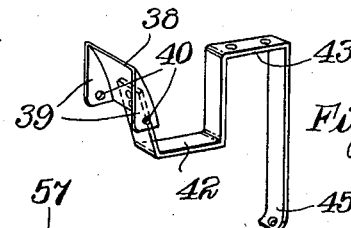
Fig. 5  Fig. 6  Fig. 9  Fig. 7
Fig. 8
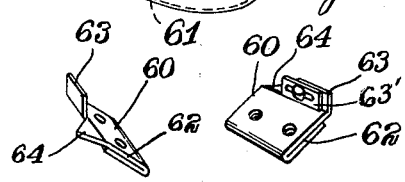
Fig. 10  Fig. 11
Inventor
Manthen Aspenes
Attorney Patented Aug. 8, 1939

2,168,855

UNITED STATES PATENT OFFICE 2,168,855

SEEDER

Manthen Aspenes, Bruce, Wis., assignor, by direct and mesne assignments, to Emil F. Pratt, Ladysmith, Wis.

Application August 7, 1936, Serial No. 94,762

5 Claims. (Cl. 111—90)

My invention relates to an improvement on seeders of a type particularly designed to eliminate the necessity of a check-row wire or other mechanical means for maintaining the seeds in proper rows.

In the planting of seed, such as corn for example, it has been common practice to use a check wire which is secured at one end of the field and which automatically operates seed dropping means at predetermined intervals as the seeding device travels the length of the field in order to maintain even rows both longitudinally and transversely of the field, to simplify the cultivation of the corn or other plants. Such a check wire is usually quite effective in maintaining the seed at proper intervals but requires considerable time, and effort due to the fact that the position of the check wire must be changed at each end of the field for every row or multiple of rows planted.

It is the purpose of the present invention to provide a seeding means which will plant seed in a manner to maintain the proper distance between hills without the use of a check wire in order to avoid the time and expense of a seed dropping mechanism operated by the check wire.

It is a further object of my invention to provide a seeder which will operate to plant seeds at given predetermined intervals and which requires but a very small number of movable parts. Accordingly, the maintenance cost of my seeder is exceedingly low for there are few wearing parts and few parts which may be damaged by the operation thereof.

It is a further feature of my invention to provide a seeder which operates by contact with the ground over which it passes to open the seed dropping means at predetermined intervals. In this way the use of seed dropping valves actuated by an outside source of power may be completely eliminated.

It is a further feature of my invention to provide a series of seeding elements arranged in parallel relationship and flexibly connected to rotate in unison. By this means the various seeding elements are so arranged as to drop seeds in unison, furthermore, the provision of several units connected to rotate in unison overcomes the tendency of any one unit to operate out of proper alignment due to any unevenness in the ground surface over which the seeding means are traveling.

It is a further object of my invention to comprise a seeder which is constructed in the form of a wheel having a central seed reservoir and having a series of angularly spaced seeding shoes in the form of chutes which receive a certain predetermined amount of seed during the rotation of the wheel and drop this predetermined amount of seed into the ground through a pivoted mouth on the end of the chute which opens when in position in the ground to deposit the seed. Aside from the fact that the entire seeder is rotatable upon a central axis there are no relatively movable parts with the exception of the means which operate the closures on the ends of the seeding tubes.

It is a further feature of my invention to provide a seeding device having the various parts thereof readily removable in order that the various parts of the device may be quickly removed for replacement or repair. Accordingly, even though for some unforseen reason the device should become stopped up by dirt or other foreign matter, the various parts of the device through which the seeds pass during the seeding operation may be readily removed and cleaned.

It is also a feature of my invention to provide a means for measuring or metering the amount of seed which will pass into the seed spout or tube in each revolution thereof. This means can be quickly and readily interchanged for another measuring means of different size to provide any desired adjustment and to plant any desired amount of seed and to compensate for seeds of various sizes.

These objects together with other objects and novel features of my invention will be more clearly and fully set forth in the following specification and claims.

In the drawings forming a part of the specification—

Figure 4 is a vertical longitudinal section through my seeding device.

Figure 5 discloses in perspective one portion of the seed spout closure.

Figure 6 is a perspective view of the other portion of the seed spout closure.

Figure 7 is a cross-sectional view through the seed spout taken on the line 7—7 of Figure 4.

Figure 8 is a perspective view of the seed cup used in conjunction with the seed spout.

Figure 9 discloses in perspective a baffle device which assists in metering the proper number of seeds to be planted.

Figure 10 is a perspective view of a guard for metering the number of seeds to be planted.

Figure 11 is a perspective view of the seed metering device illustrated in Figure 10 disclosing a metering means of a slightly different size to accommodate a greater number of seeds.

Figure 1:
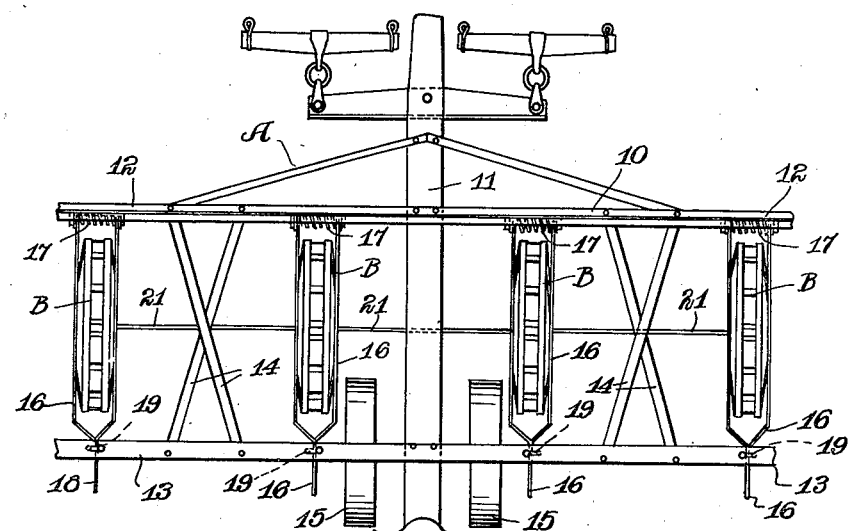
Figure 1 is a plan view of a series of seeders arranged in parallel relationship.

The seeder A as illustrated in Figure 1 of the drawings, may be provided with a suitable frame 10 of any desired shape having a draw-bar 11 or other means by which the seeder may be drawn over the ground to be seeded. The frame 10 comprises, in the construction disclosed, a pair of substantially parallel bars 12 and 13 which are secured in spaced relation by the draw-bar 11 and by brace means such as 14. A pair of supporting wheels 15 may be provided at the rear of the device.

To the forward bar 12 and pivotally connected thereto are a series of bifurcated frames 16 each of which is adapted to support a seeding unit B. Each frame 16 is pivotally connected to 12 at its bifurcated end and is provided with a spring 17 at the pivot point which tends to hold the various seeding units into contact with the ground. The opposite end 18 of each frame 16 extends through a suitable U-bolt 19 or J-shaped bolt which limits the downward movement of this end of the frame.

The units B are constructed as will be hereinafter more completely described and are connected together by means of flexible shaft 21 or by other suitable means so that all of the various seeding units B will rotate in unison. The seeder may therefore be arranged to seed in unison thereby maintaining straight rows of the seed transversely of the field.

The seeding unit B is mounted upon a central shaft 20 which terminates within a sleeve 22 which is secured at opposite ends to hubs 23 and 24. The hub 23 receives the end of the sleeve 22 and of the shaft 20 and also receives the end of another shaft 25.

Extending radially from the hubs 23 and 24, I provide a series of spokes 26 which are secured to the hubs and which connect the hubs 23 and 24 with a pair of parallel rings 27 held in spaced relation by angularly spaced spacing bars 28. Extending about the inner portion of these spokes 26, I provide a drum shaped receptacle or reservoir for the seeds to be planted. This reservoir 29 is sufficiently large to contain seeds for planting a substantial area of ground.

Circumferentially spaced openings 30 are provided in the reservoir 29 intermediate the ends thereof, which openings 30 provide access to seed chutes 32 terminating in a seed chute closure device. The closure device is formed in two parts illustrated in Figures 5 and 6 of the drawings. In Figure 5 may be seen the stationary portion 33 of the closure which is provided with a closure surface 34, side flanges 35 to which the movable portion of the closure is pivotally attached, and an attaching flange 36. The flange 36 is clamped between one of the cross members 28 and a clamping bar 37 to hold the member 34 in position as may be seen in Figure 3 of the drawings.

To the side flanges 35 of the member 33 is pivotally attached the movable closure member 38. The member 38 is provided with a pair of parallel side flanges 39 which may be pivotally attached at 40 to the member 33. Extending from the member 38 I provide an operating bar 42 which is provided with a round contacting portion 43 to which is attached the ground engaging shoe 44. This bar 42 is also provided with an inwardly depending end 45 which is connected by a spring 46 to another of the cross members 28. The spring 46 urges the bar 42 outwardly and holds the closure in closed position.

Figure 3:
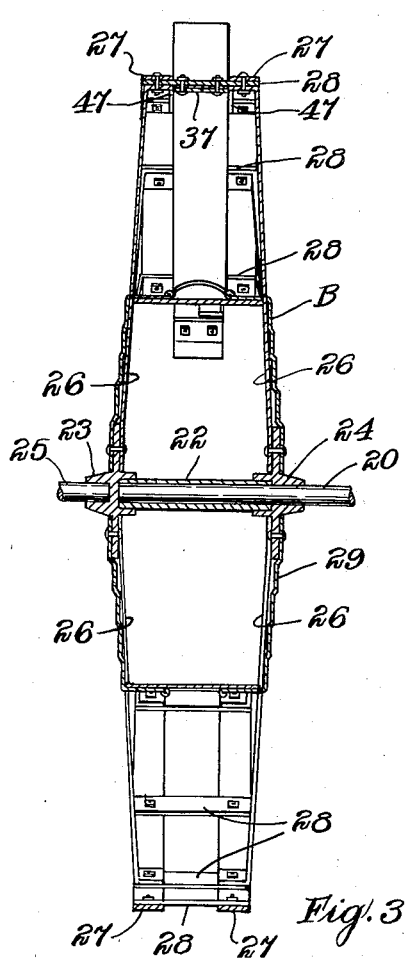
Figure 3 is a vertical cross-sectional view through a seeder.
Figure 2:
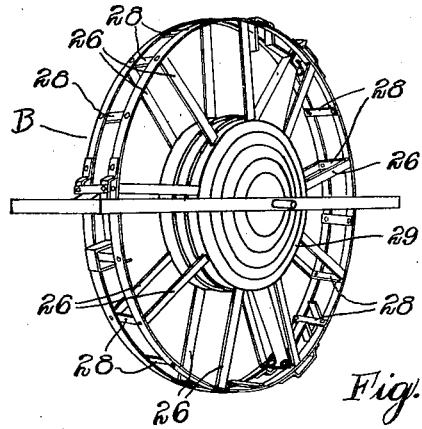
Figure 2 is a perspective view of one seeder element.

As may be seen in Figures 3 and 7 of the drawings, the rings 27 forming the wheel are provided with inwardly extending angular members 47 extending into engagement with the lower extremities of the side flanges 35 of the closure member 33. The outer end of each spout 32 extends between a pair of these angles 47 and is held in this position by the engagement of the inwardly extending ends 48 of the spring 49. When the spout 32 is to be disengaged, the ends 48 of the spring 49 are withdrawn from the openings 50 in the chute 32.

Each of the openings 30 in the seed receptacle 29 is provided with a seed metering means acting to measure the amount or number of seeds entering each chute 32. Over one edge of each opening 30 I provide a stop or baffle means illustrated in Figure 9 for assisting in holding the chute 32 in position and for assisting in the metering action. This means comprises a strip of sheet metal or the like which is turned up at one end 52 to provide a finger engaging means and provided with a substantially flat portion 53 which may be curved slightly to fit the arcuation of the cylindrical receptacle 29. This member is bent over double at the other end 54 and is provided with a stop flange 55. A flange 56 on the upper side of this member bears against one side of the chute 32 to hold this chute in position. The other edge of the chute is notched to extend into the opening 30 so that this portion of the chute is held in position covering the opening 30 as long as the spring 49 holds the outer end of this chute in correct position.

Extending inwardly into the reservoir or drum 29 through each opening 30, I provide a cup 57 of a type illustrated in Figure 8 of the drawings. These cups 57 are notched adjacent one end at 58 to slip over one edge of the opening 30 on either edge of the stop 59 illustrated in Figure 9 of the drawings. To the outer surface of the cup 57 is secured a metering device 60 illustrated in Figures 10 and 11 of the drawings. The metering device 60 is provided with an attaching flange 62 with a stop flange 63 which may be of any desired width to accommodate a given number of seeds and is also provided with a tongue 64 which extends substantially parallel to the outer surface of the reservoir 29 at that point. In an observation of Figure 4 of the drawings, it will become apparent that the seeds from within the reservoir 29 may pass into the cups 57 between the tongue 64 and the cylindrical wall of the seed reservoir 29. It will also be seen that only a predetermined number of seeds will enter the cup 57 as the movement of the seeds over the tongue 64 is limited by the stop flange 55 on the stop 59. The space between the stop flanges 69 and 55 may be termed a seed measuring chamber.

Each cup 57 is provided with a baffle 61 extending thereinto to prevent the seeds from dropping out over the lip 64 or tongue of the metering device 60. When the seeds drop over the stop flange 55, they drop onto the baffle 65; and are guided in the subsequent rotation of the device into the cup 57. The baffle 61 prevents the seeds from sliding over the bottom of this cup 57 and out over the tongue 64. The seeds are held by the baffle 61 until the chute 32 assumes almost a vertical position, whereupon the seeds drop down into the closure mechanism at the extremity of the chute.

Figure 11 illustrates a plate 63' bolted to the stop flange 63. The plate 63' is slotted to provide a lateral adjustment for this plate with respect to the flange 63. The space through which the seeds must enter may in this manner be adjusted in accordance with the seeds being planted. The metering device may in this manner be made adjustable to compensate for varying numbers of seeds and varying amounts in each hill.

From the foregoing description, the operation of the device is believed clearly understood. The seed reservoir or drum 29 of the various seeding units B are first supplied with seeds. The seed drum 29 may be filled by removing the spring 49 at the outer end of any of the chutes 32 which happens at the time to be uppermost. The chute 32 is removed and the cup 57 is taken out of position in the opening 30. The seeds may be then inserted through this opening 30. The cup 57 and the chute 32 are then put back into place and held in position by the spring 49.

In the movement of the unit B along the surface of the ground, each chute 32 is successively brought into substantially vertical position, and the closure comprising the members 33 and 38 digs down into the surface of the ground. Shortly after this closure is forced into the ground, the ground engaging shoe 44 on the portion 43 of the arm 42 engages the ground and is urged inwardly against the tension of the spring 46. This action pivots the closure member 38 with respect to the member 33 and opens this closure member allowing the seed to be deposited into the ground in the opening formed by the closure member extending thereinto.

The seeds from within the reservoir 29 are guided by the lip or tongue 64 into position in the seed measuring chamber just within the end of the cup 57 and the movement of the seed into the cup 57 is impeded by the stop flange 55 on the stop 59. It may be seen that the width of the tongue 64 regulates the amount or number of seed which will enter the cup 57. As the seeding device B continues its rotation, and the tongue 64 is raised above the level of the seeds within the drum 29, the seeds drop over the stop flange 55 onto a baffle 65 in the chute 32. As the seeding element B continues its rotation and the chute 32 approaches vertical position on the top of the seeder, the seeds fall back from the baffle 65 into the pocket 57. The baffle 61 holds the seeds from falling out through the open space above the tongue 64. As the chute 32 pivots downwardly again, the seeds are dropped back into the chute 32 and fall downwardly into the closure formed by the members 33 and 38 into position to be inserted into the ground upon the opening of this closure. Simultaneously, of course, additional seeds are entering past the lip 64 to be inserted into the ground at the next revolution of the seeder.

It may be seen that my seeder is simple and readily detachable and includes a minimum of moving parts. There are accordingly an extremely small number of parts which will become damaged due to wear, and it is obvious that any part of the device may be replaced with ease.

In accordance with the patent statutes, I have described the principles of operation of my seeder and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A seeder including a seed containing drum, means for axially supporting said drum for rotation, cups extending into said drum each having an opening leading to the interior of said drum, baffle means for supporting a predetermined number of seeds in said opening, the seeds dropping into said cups upon continuation of the rotation of the drum, and seed chutes connected adjacent said cups to receive seeds therefrom.

2. A seeder including a seed containing drum, seed chutes extending therefrom, means for rotatably supporting said drum, a measuring means into which a predetermined number of seeds are guided in the rotation of said drum, a cup connected to each separate chute into which said predetermined number of seeds are dropped in the rotation of said drum, said cup acting upon rotation of said drum, to drop said seeds into the chute to which it is connected, and means on said chutes for dropping said seeds into the ground.

3. A seeder comprising a rotatable seed reservoir, a spout extending from said reservoir rotatable into engagement with the ground, a wall separating said spout from said seed reservoir, a seed measuring chamber in said reservoir, said wall having an aperture therethrough through which seeds may enter said spout, baffle means holding the seeds discharged from said chamber through most of each revolution of said reservoir and dropping said seeds into said spout approximately the time said spout moves into engagement with the ground.

4. A seeder comprising a rotatable seed reservoir, a spout extending from said reservoir rotatable to drop seeds into the ground, a wall having an aperture therethrough dividing said reservoir from said spout, a measuring chamber adjacent said aperture for containing a predetermined amount of seed, said chamber discharging said seeds therefrom when said aperture is rotated to approach substantially vertical position in the rotation of said reservoir, baffle means supporting said measured seeds until said spout approaches ground engaging position, and releasing said seeds by continued rotation when said ground engaging position is approached.

5. A seeder including a rotatable seed drum, a seed spout extending radially from said drum, a wall between said spout and said drum having an aperture through which seeds from said drum may flow, a measuring chamber limiting the amount of seed passing through said aperture, said chamber acting to release the seeds therein during rotation of said drum, and baffle means guiding said measured seeds into said spout after a predetermined rotation of said drum.

MANTHEN ASPENES.